O. GARDNER.
Meat-Choppers.
No. 140,696.  Patented July 8, 1873.
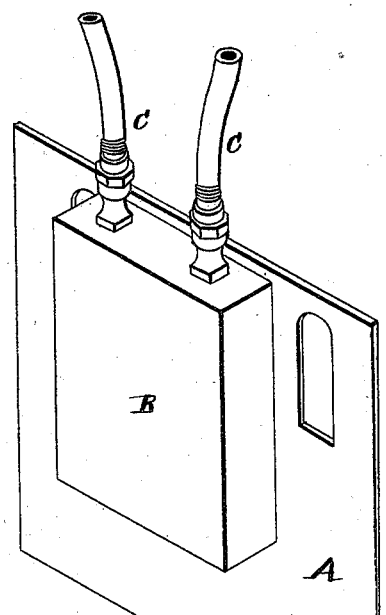
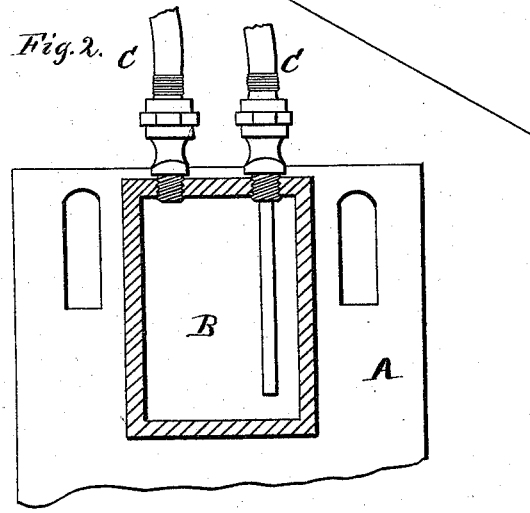
Witnesses:  Inventor.

UNITED STATES PATENT OFFICE.

OLIVER GARDNER, OF NEW YORK MILLS, N. Y.

IMPROVEMENT IN MEAT-CHOPPERS.

Specification forming part of Letters Patent No. 140,696, dated July 8, 1873; application filed June 4, 1873.

*To all whom it may concern:*

Be it known that I, OLIVER GARDNER, of New York Mills, in the county of Oneida and in the State of New York, have invented certain new and useful Improvements in Meat-Chopper; and do hereby declare that the following is a full, clear, and exact description thereof, reference being had to the accompanying drawings and to the letters of reference marked thereon making a part of this specification.

The nature of my invention consists in constructing a knife for chopping meat, with a steam-box attached to same, as will be hereinafter set forth.

In the annexed drawings, A represents a knife-blade made of any suitable size and shape for chopping meat. Upon one side of this knife-blade is formed a small steam-box or hot-air box, B. Passing into this box are two India-rubber pipes, C C. One of these pipes is intended to convey steam or hot-air into the box, while the other is for the purpose of allowing said steam or air to escape. By bringing steam or hot air in connection with the knife it is kept hot, and the meat is thus prevented from sticking to it. The India-rubber tubes, being flexible, allow the knife to be raised and lowered with ease in the process of chopping.

Having thus fully described my invention, what I claim as new, and desire to secure by Letters Patent, is—

The combination, with a chopping-blade, of a hot air or steam box, as and for the purpose set forth.

In testimony that I claim the foregoing, I have hereunto set my hand this 15th day of May, 1873.

OLIVER GARDNER.

Witnesses:
    JOHN W. BOYLE,
    A. N. MARR.